(12) United States Patent
Sanchez

(10) Patent No.: US 12,124,628 B2
(45) Date of Patent: Oct. 22, 2024

(54) PROJECTION SYSTEM FOR SMART RING VISUAL OUTPUT

(71) Applicant: BlueOwl, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

(21) Appl. No.: 18/229,393

(22) Filed: Aug. 2, 2023

(65) Prior Publication Data

US 2023/0376113 A1 Nov. 23, 2023

Related U.S. Application Data

(63) Continuation of application No. 18/056,417, filed on Nov. 17, 2022, now Pat. No. 11,775,065, which is a
(Continued)

(51) Int. Cl.
*G06F 3/01* (2006.01)
*B60Q 1/26* (2006.01)
(Continued)

(52) U.S. Cl.
CPC ........... *G06F 3/014* (2013.01); *B60Q 1/2673* (2013.01); *G06F 3/017* (2013.01); *G06F 3/0485* (2013.01);
(Continued)

(58) Field of Classification Search
CPC .. G09G 2380/10; G09G 3/001; B60Q 1/2673; G06F 3/014; G06F 3/017; G06F 3/0485
(Continued)

(56) References Cited

U.S. PATENT DOCUMENTS

2016/0236692 A1* 8/2016 Kleen ................... B42D 9/004
2016/0292563 A1* 10/2016 Park ........................ G06F 3/016
(Continued)

OTHER PUBLICATIONS

Laput, G. et al. ("Skin buttons: cheap, small, low-powered and clickable fixed-icon laser projectors", UIST '14: Proceedings of the 27th annual ACM symposium on User interface software and technology, Oct. 2014 pp. 389-394; https://doi.org/10.1145/2642918. 2647356, hereinafter "Laput") (Year: 2014).*

*Primary Examiner* — Mark Edwards
(74) *Attorney, Agent, or Firm* — BRYAN CAVE LEIGHTON PAISNER LLP

(57) ABSTRACT

A system for displaying information indicative of driving conditions, to a driver, using a smart ring are disclosed. An exemplary system includes a smart ring with a ring band having a plurality of surfaces including an inner surface, an outer surface, a first side surface, and a second side surface. The system further includes a processor, configured to obtain data from a communication module within the ring band, or from one or more sensors disposed within the ring band. The obtained data are representative of information indicative of one or more driving conditions to be displayed to the driver. The smart ring also includes a projector module display disposed on at least one of the plurality of surfaces, and configured to present information indicative of the one or more driving conditions.

21 Claims, 8 Drawing Sheets

Related U.S. Application Data continuation of application No. 16/927,253, filed on Jul. 13, 2020, now Pat. No. 11,537,203.

(60) Provisional application No. 62/990,109, filed on Mar. 16, 2020, provisional application No. 62/877,391, filed on Jul. 23, 2019.

(51) Int. Cl.
*G06F 3/0485* (2022.01)
*G09G 3/00* (2006.01)

(52) U.S. Cl.
CPC ......... *G09G 3/001* (2013.01); *G09G 2380/10* (2013.01)

(58) Field of Classification Search
USPC .......................................................... 345/156
See application file for complete search history.

(56) References Cited

U.S. PATENT DOCUMENTS

| | | | | |
|---|---|---|---|---|
| 2018/0120892 | A1* | 5/2018 | von Badinski | A61B 5/746 |
| 2018/0257668 | A1* | 9/2018 | Tonshal | H04W 4/023 |
| 2018/0300467 | A1* | 10/2018 | Kwong | G06F 21/32 |
| 2020/0005791 | A1* | 1/2020 | Rakshit | G10L 15/26 |

* cited by examiner

PROJECTION SYSTEM FOR SMART RING VISUAL OUTPUT

CROSS-REFERENCES TO RELATED APPLICATIONS

This application is a continuation of U.S. patent application Ser. No. 18/056,417, filed Nov. 17, 2022, which is a continuation of U.S. patent application Ser. No. 16/927,253, filed Jul. 13, 2020, which claims priority to U.S. Provisional Patent Application No. 62/877,391, filed Jul. 23, 2019, and U.S. Provisional Patent Application No. 62/990,109, filed Mar. 16, 2020, the entire disclosures of which are incorporated by reference herein for all purposes.

FIELD OF THE DISCLOSURE

The present disclosure generally relates to implementations of smart ring wearable devices and, more particularly, to methods and devices for displaying information indicative of driving conditions to a driver via visual projections from smart ring wearable devices.

BACKGROUND

Information pertaining to driving conditions of a vehicle and/or driver are valuable for navigation of the vehicle, ensuring safe operation of the vehicle, and lawful operation of the vehicle. Typically, operators of vehicles are provided, via a console display within the vehicle, with a limited amount of information pertaining to the vehicle (such as a speed of the vehicle or operational statuses of various elements of the vehicle such as the motor, oil levels, heat levels, etc.). In typical vehicles, information provided by the vehicle to an operator of a vehicle is typically limited to the operational statuses of the vehicle itself.

BRIEF SUMMARY

As disclosed herein, a smart ring device is configured for displaying information indicative of driving conditions to a driver via a visual projection (sometimes simply referred to herein as a "projection" or "projections"). The smart ring device allows for the presentation of a multitude of different factors and conditions to a driver of a vehicle (e.g., a wearer of the smart ring) during operation of a vehicle. One benefit of the smart ring device is that the smart ring may measure biometrics of the driver and display indications of the biometrics such as a heart rate, blood pressure, blood-oxygen level, etc. Further, based at least in part upon the biometric information, the smart ring may provide indications to a driver of an operational state of the driver (e.g., a weariness level of a driver, an inebriation level, etc.) to indicate a potential risk of hazardous driving of the driver. The smart ring may be easily worn by a user of the smart ring throughout the user's day, and/or overnight, allowing the smart ring to track sleeping habits and physical exertion allowing for the smart ring to more accurately determine physical states of the wearer of the smart ring, compared to other user associated cellular devices such as a cell phone or step tracker. Additionally, the smart ring may display to a driver indications of environmental conditions, operating conditions of the vehicle, conditions of other drivers, conditions of other vehicles, or may display driving risk levels based at least in part upon any of the conditions, or combinations of conditions.

The smart ring device can provide indications to a driver without the driver having to remove any hands from a steering wheel of the vehicle, or having to shift their gaze to a central console, which can reduce the risk of hazardous driving, and/or unlawful driving.

In an embodiment, a system for displaying information indicative of driving conditions to a driver, via a smart ring device includes a ring band having a plurality of surfaces including an inner surface, an outer surface, a first side surface and a second side surface. The smart ring further includes a processor, configured to obtain data from a communication module disposed within the ring band or from one or more sensors disposed within the ring band, the data being representative of information indicative of the one or more driving conditions. The smart ring also includes a projector module disposed on at least one of the plurality of surfaces and configured to present, to a user of the smart ring device, information indicative of one or more driving conditions.

The system may further include a power source disposed within the ring band configured to power the smart ring device, and a memory to store computer-executable instructions. The computer executable instructions may cause the processor to obtain information indicative of the one or more driving conditions, and to control the projector module to cause the projector module to display visual indicia indicative of the one or more driving conditions.

The communication module may be configured to provide communications between the smart ring device and external devices and systems. The smart ring device may communicate, via the communication module, with a mobile device associated with the driver of a vehicle, wherein the mobile device is configured to obtain information from sensors of the vehicle.

The system may further include a user input unit communicatively coupled to the processor. The user input unit may include haptic sensors, microphones, or other sensors to enable a user to provide a user input to the user input unit. The processor may further be configured to cause the projector module to project the information indicative of the identified one or more driving conditions onto a specific surface, or a selected portion of a surface in response to receiving a user input representing a selection of the selected portion.

The system may further include an optical source to provide optical energy and projection optics configured to project the optical energy from the optical source onto a surface to display the information indicative of the one or more driving conditions. The system may also include an optical source disposed on the smart ring, and projector optics that are physically independent from the smart ring device and are configured to project optical energy from the optical source onto a surface to display information indicative of the one or more driving conditions. Further, the system may include optical sensors configured to receive optical feedback from a user, wherein the optical feedback constitutes a user input including one of a hand gesture, a hand movement, an input performed by a stylus, a gesture performed on the surface of the projection, or a virtual interaction with the projection.

The system may further include biometric sensors configured to monitor biometrics of the wearer of the smart ring, and further configured to communicate, via the communication module, biometric information to a mobile device associated with the driver of the vehicle.

The information indicative of driving conditions may be indicative of a speed of a vehicle, an acceleration of a vehicle, a current weather condition, a sleepiness condition of a driver, a cognoscente condition of a driver, an inebriation condition of a driver, an operational status of a vehicle, and/or biometric information of a wearer of the smart ring device.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Figure 1:
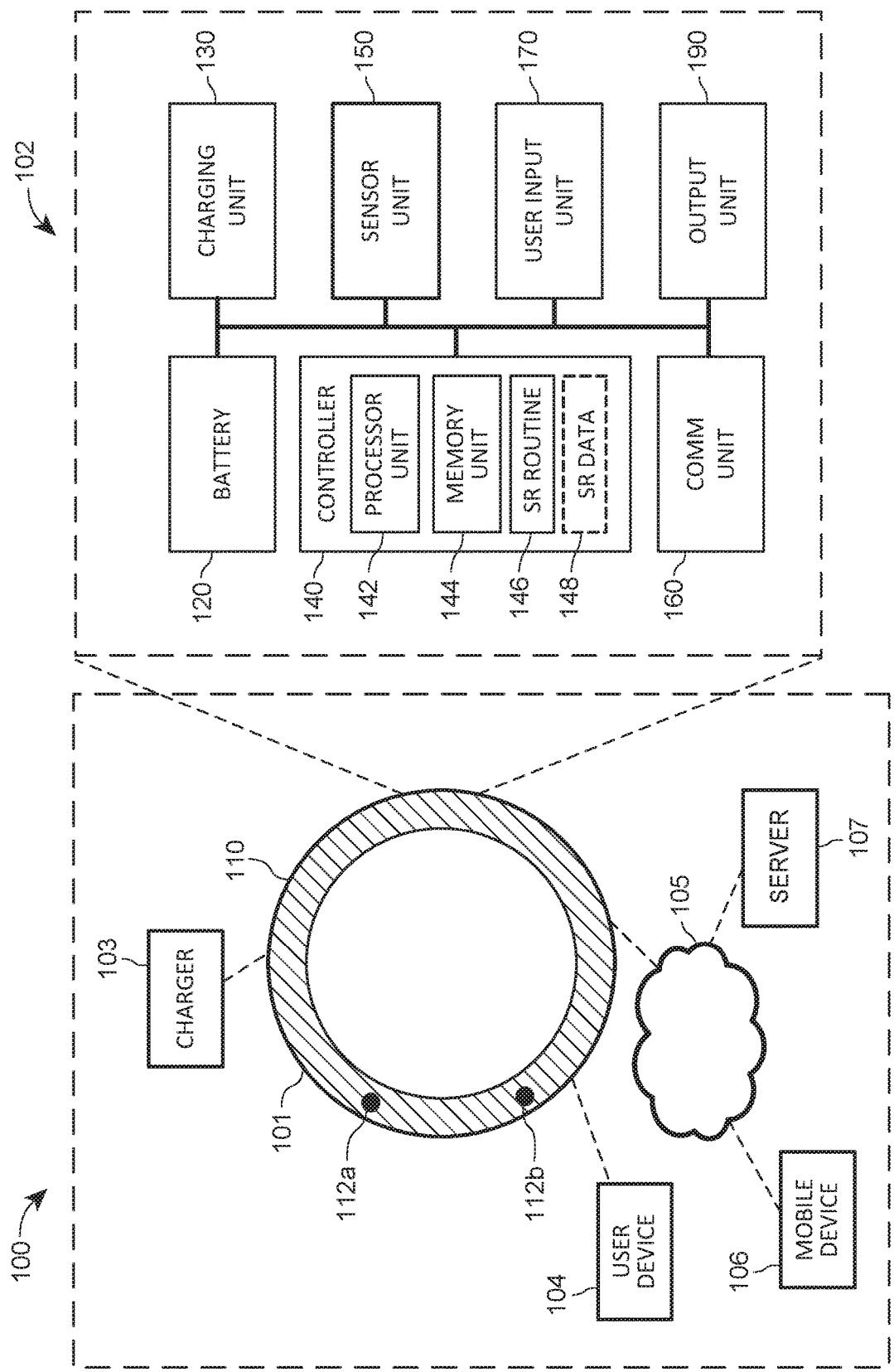
FIG. 1 illustrates a system comprising a smart ring and a block diagram of smart ring components according to some embodiments.
Figure 2:
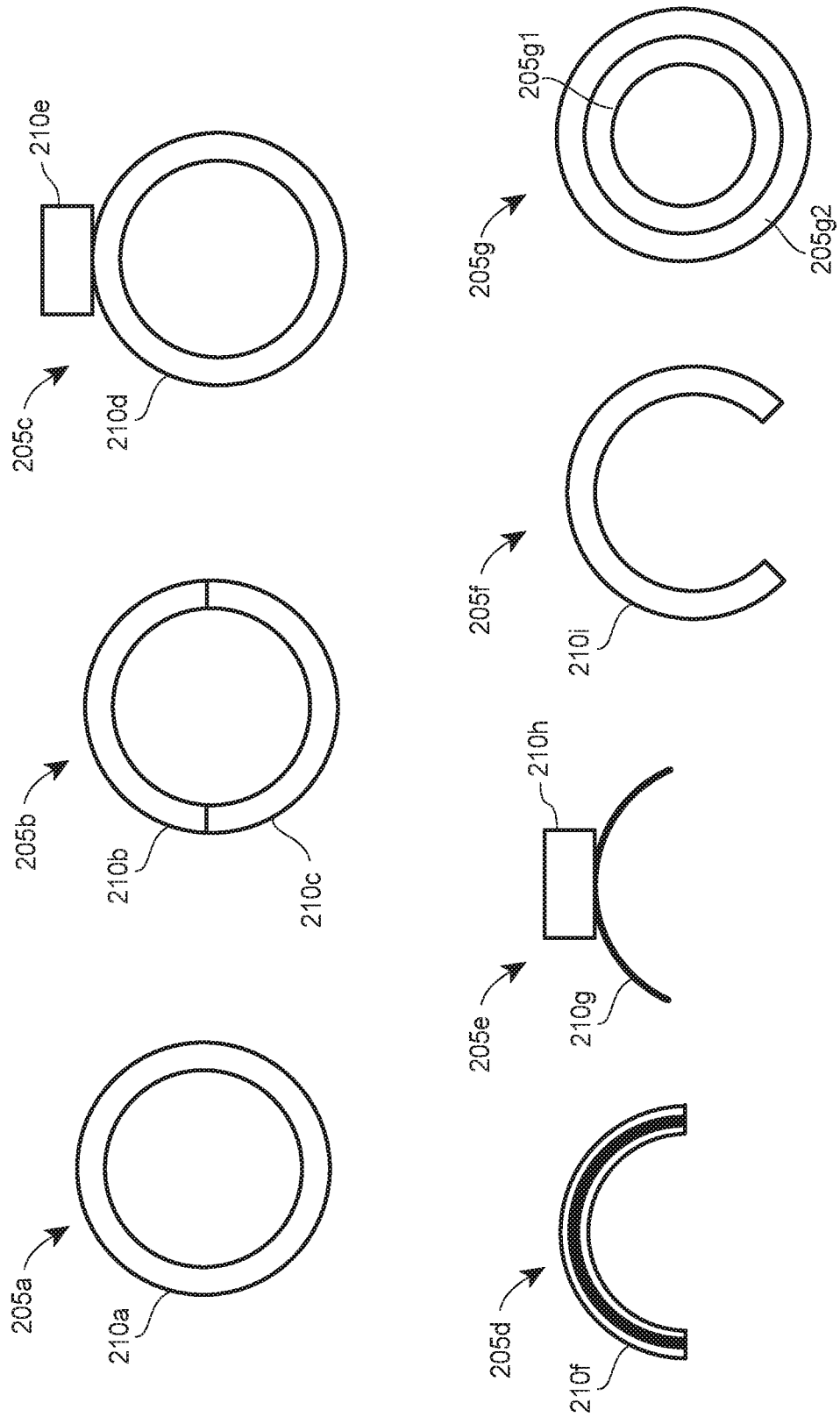
FIG. 2 illustrates a number of different form factor types of a smart ring according to some embodiments.
Figure 3:
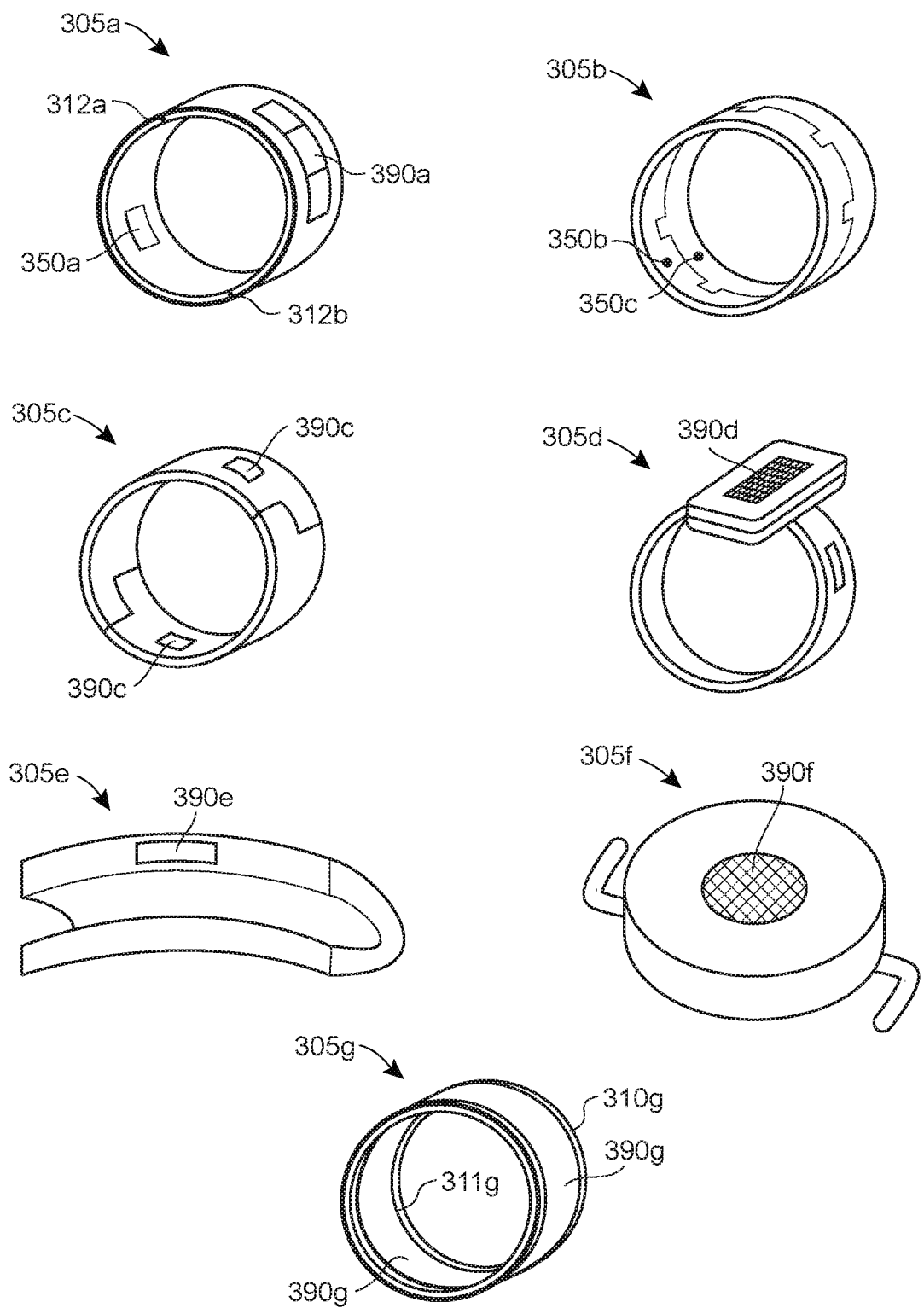
FIG. 3 illustrates examples of different smart ring form factors and configurations.
Figure 5:
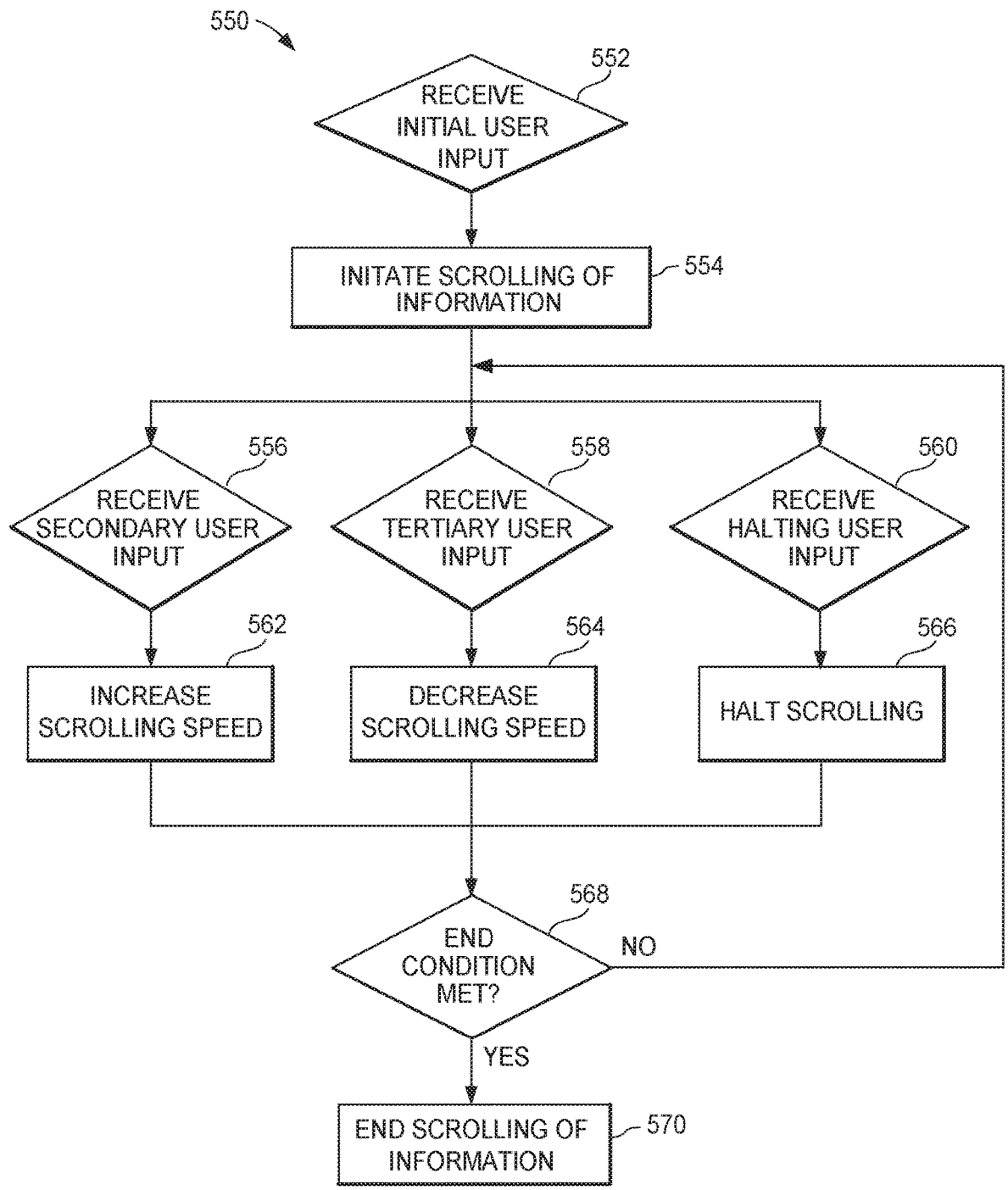
FIG. 5 is a flow diagram of a method for controlling the scrolling of information across a projection on a surface, such as a projection from a projector module of a smart ring according to some embodiments.
Figure 6:
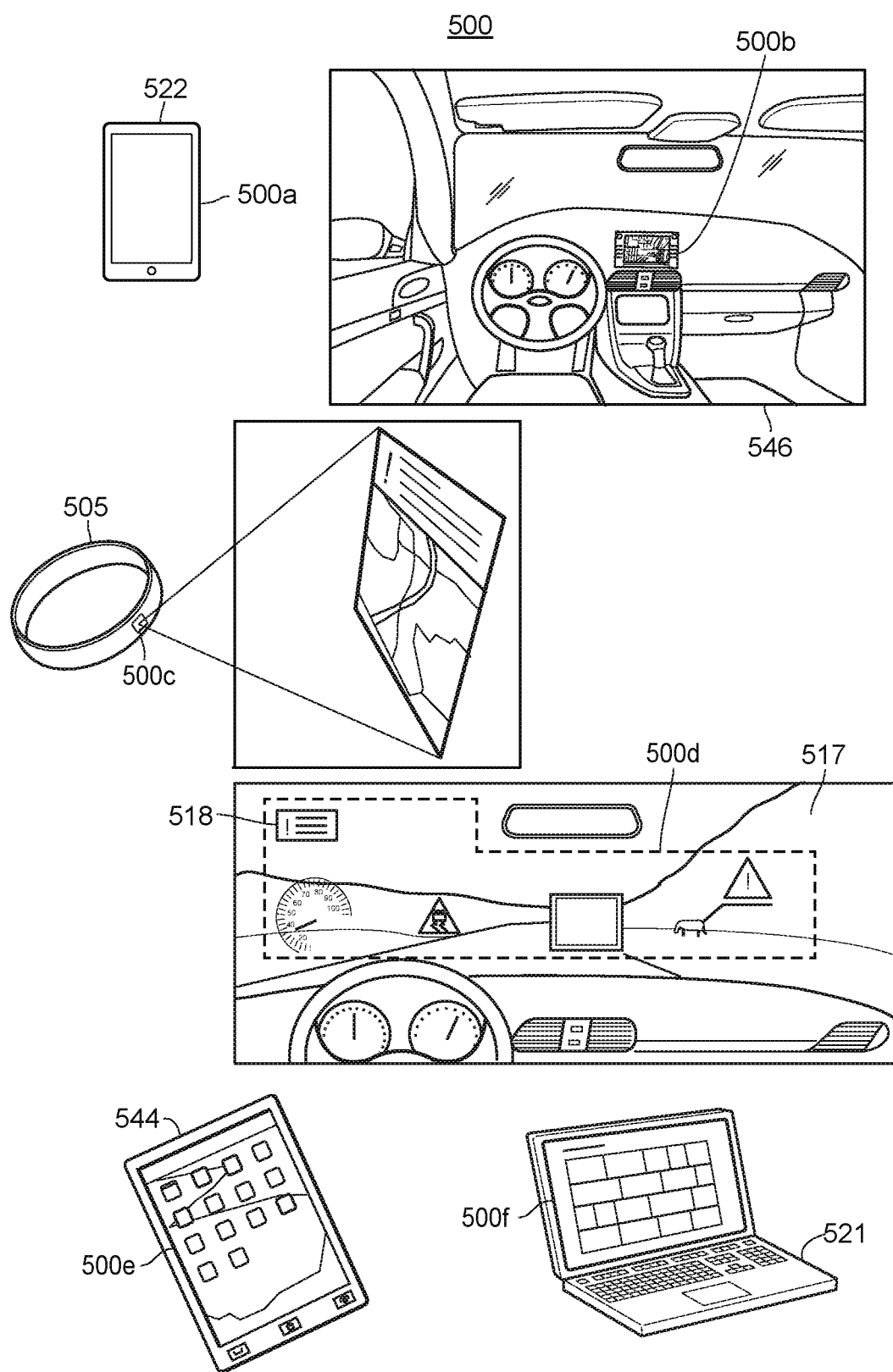
FIG. 6 illustrates example displays.
Figure 7:
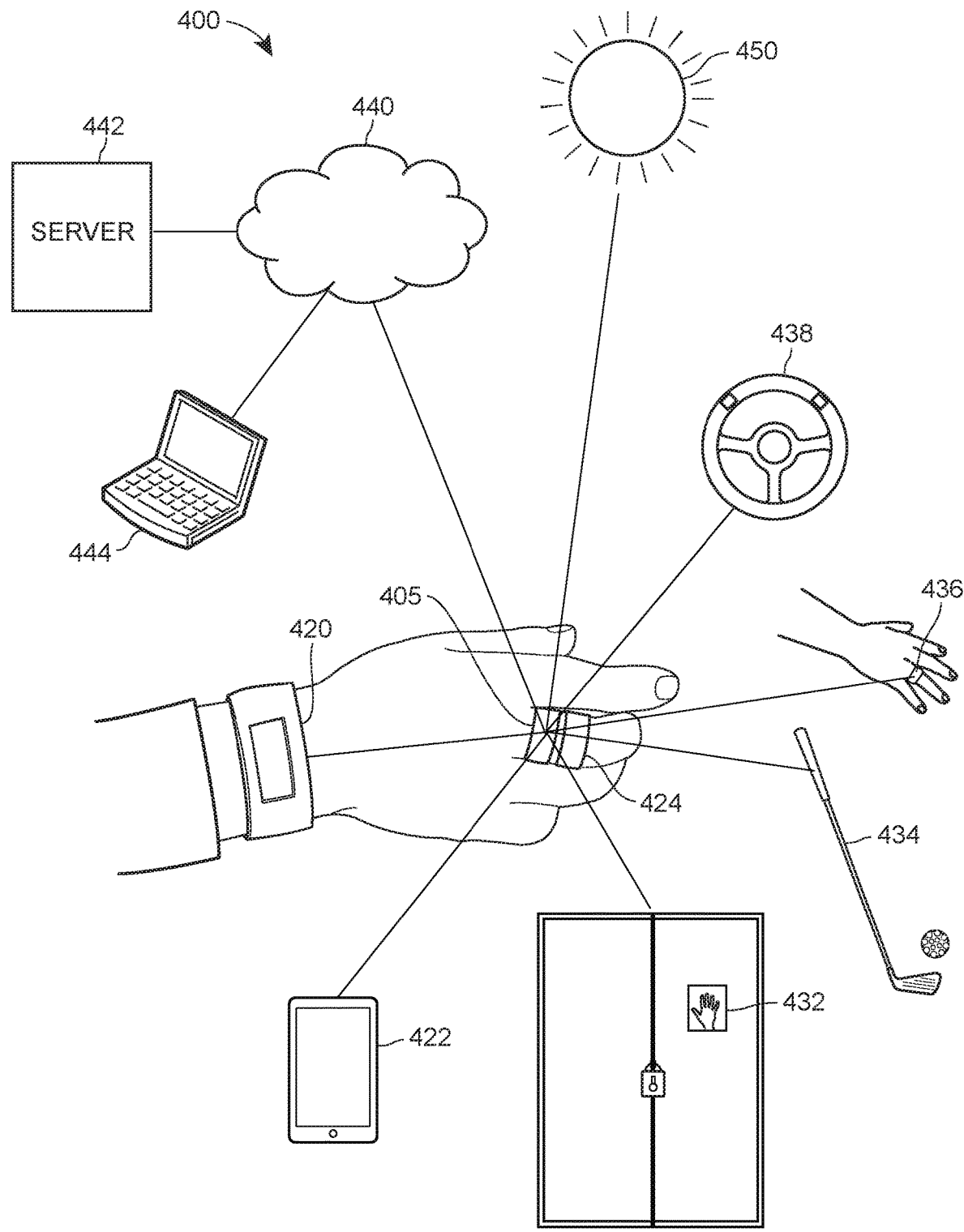
FIG. 7 illustrates an environment within which a smart ring may operate according to some embodiments.

Various techniques, systems, and methods are described below with reference to FIG. 1, FIG. 2, FIG. 3, FIG. 4A, FIG. 4B, FIG. 4C, FIG. 4D, FIG. 5, FIG. 6, and FIG. 7. FIG. 1, FIG. 6, and FIG. 7 illustrate example systems and system components that incorporate a smart ring. FIG. 2 and FIG. 3 depict various form factors and configurations of smart ring embodiments. FIG. 4A, FIG. 4B, FIG. 4C, and FIG. 4D depict smart ring devices with projector module displays for displaying information. FIG. 5 illustrates a method of controlling the scrolling of information across a projection from a projector module of a smart ring device.

Specifically, the following is described: (I) an example smart ring system 100 (shown in FIG. 1), configured to present information indicative of driving conditions to a driver of a vehicle, including a smart ring 101, a set of smart ring components 102, and one or more devices or systems in communication with the smart ring including a user device 104, a mobile device 106, and a server 107; (H) smart ring form factor types of the smart ring 101 (FIG. 2); (HI) example surface element configurations of the smart ring form factor types of the smart ring 101 (FIG. 3); (IV) examples of smart ring configurations with projector modules as output devices (FIG. 3); (V) smart ring examples with projector modules for projecting characters and symbols (FIG. 4A, FIG. 4B, FIG. 4C, and FIG. 4D and FIG. 5); (VI) an example of optical user inputs for virtual projection interactions; (VII) example smart ring displays (FIG. 6); (VIII) an example environment 400 in which smart ring 101 may operate (FIG. 7), including (1) server 442 and (2) other sample devices; (IX) additional considerations; and (X) general terms and phrases.

The "driving conditions" identified by the smart ring or communicated by the smart ring to a user of the smart ring may be: (i) biometrics of a user of the smart ring including, without limitation, pulse rate, blood flow, blood oxygen level, blood pressure, skin salinity level, temperature, weariness level, a cognoscente condition of the user, an inebriation condition of the user, or any other biological and biometric information; (ii) a state of a user such as erratic behavior of the user, sleepiness of the user, or a stress level of the user; (iii) detected vehicular statuses such as engine temperature, oil level, a needed oil change, coolant level, exhaust fume legal compliance, break pad health, low battery charge, flat tire, alternator failure, tire alignment/misalignment, transmission issue, power steering fluid level, brake fluid level, transmission fluid level, windshield wiper fluid level, etc.; (iv) vehicular operations such as a speed of a vehicle, an acceleration of a vehicle, a current altitude of the vehicle, a lane centering of the vehicle, a fuel efficiency of the vehicle, an autopilot function status of the vehicle (e.g., autopilot is activated/not-activated), an operational of autonomous driving function of the vehicle is deactivated, an autonomous driving function of the vehicle is activated, air bags are activated/de-activated, a seat belt is latched/unlatched, a temperature of the environment inside of the cabin of the vehicle, etc.; external factors or environmental factors such as current or predicated weather conditions (e.g., rain, snow, extreme heat, etc.), current external environmental conditions (e.g., wet/slick roads, fog levels, a visibility level, dangerous breathing air, external temperature, etc.), current conditions inside of the cab of the vehicle (e.g., the temperature, air quality, moisture level, etc.); information and statuses of nearby vehicles, identifications that a nearby driver is driving erratically; driving conditions during operation of a vehicle such as the congestion of drivers along a road or planned trip route, the current proximity of the vehicle to external objects outside of the vehicle (e.g., other vehicles, pedestrians, trees, etc.), or other factors associated with operation of a vehicle; or another element or factor that may have an influence or impact of the operation of a vehicle.

The "data" that is received by a processor of the smart ring (via a sensor or communication module of the smart ring) and analyzed by the processor to identify the one or more driving conditions may include: biometric data of a wearer of the smart ring (e.g., representing detect heart beats, perspiration, user movement, etc.), biometric data from a user associated device, data from sensors of the vehicle (e.g., speed data, direction data, laser or camera data representing captured information regarding environmental or road conditions), data from a central console of the vehicle, data from sensors of other vehicles, data from central consoles of other vehicles, data from user associated devices or drivers from other vehicles, data from a network, data associated with a driving history of a driver, data associated with a health history of a driver, data associated with behavior trends of a driver, or data indicative of any of the driving conditions described above.

The projector module of the smart rings described herein may be any suitable optical source and projection optics needed for projecting an image onto a surface. In examples, the projector module may project color images, monochromatic images, a black and white images, or another type image for relaying information to a driver. Optical sources for projector modules may include light emitting diodes (LEDs), laser diodes (LDs), organic LEDs (OLEDs), a black body source, or other sources of optical energy. Additionally, the projector module may be configured to project on a multitude of surfaces such as a dashboard of a vehicle, a front windshield of a vehicle, a window of a vehicle, a ceiling of the inside of a cab of a vehicle, a table, a designated surface for displaying the information, or another surface for a projection to display information to a driver. By projecting information onto the front windshield of a vehicle the driver may be presented with information inside of their field of view without having to look at a central console which may reduce risky driving behavior and distractions to a driver operating a vehicle.

I. An Example Smart Ring Environment

FIG. 1 illustrates a system 100 that may be utilized to display relevant information to a driver, thereby improving the driver's awareness of the state of the vehicle, environment, and even his or her own state and consequently improving the driver's safety profile and reducing his or her risk exposure while driving. The system 100 may obtain information indicative of driving conditions as described herein to display information indicative of the driving conditions to the driver of the vehicle.

The system 100 comprises (i) a smart ring 101 including a set of components 102 and (ii) one or more devices or systems that may be electrically, mechanically, or communicatively connected to the smart ring 101. Specifically, the system 100 may comprise any one or more of: a charger 103 for the smart ring 101, a user device 104, a network 105, a mobile device 106, or a server 107. The charger 103 may provide energy to the smart ring 101 by way of a direct electrical, a wireless, or an optical connection. The smart ring 101 may be in a direct communicative connection with the user device 104, the mobile device 106, or the server 107 by way of the network 105. Interactions between the smart ring 101 and other components of the system 100 are discussed in more detail in the context of FIG. 7.

The smart ring 101 may sense a variety of signals indicative of activities of a user wearing the ring 101, biometric signals, a physiological state of the user, or signals indicative of the user's environment. The smart ring 101 may analyze the sensed signals using built-in computing capabilities or in cooperation with other computing devices (e.g., user device 104, mobile device 106, server 107) and provide feedback to the user or about the user via the smart ring 101 or other devices (e.g., user device 104, mobile device 106, server 107). The smart ring 101 may process the sensed signals and provide visual outputs to the user of the smart ring 101 indicative of any of the sensed signals, as discussed further below. Additionally or alternatively, the smart ring 101 may provide the user with notifications sent by other devices, enable secure access to locations or information, or a variety of other applications pertaining to health, wellness, productivity, or entertainment.

The smart ring 101, which may be referred to herein as the ring 101, may comprise a variety of mechanical, electrical, optical, or any other suitable subsystems, devices, components, or parts disposed within, at, throughout, or in mechanical connection to a housing 110 (which may be ring shaped and generally configured to be worn on a finger). Additionally, a set of interface components 112a and 112b may be disposed at the housing, and, in particular, through the surface of the housing. The interface components 112a and 112b may provide a physical access (e.g., electrical, fluidic, mechanical, or optical) to the components disposed within the housing. The interface components 112a and 112b may exemplify surface elements disposed at the housing. As discussed below, some of the surface elements of the housing may also be parts of the smart ring components.

As shown in FIG. 1, the components 102 of the smart ring 101 may be distributed within, throughout, or on the housing 110. As discussed in the contexts of FIG. 2 and FIG. 3 below, the housing 110 may be configured in a variety of ways and include multiple parts. The smart ring components 102 may, for example, be distributed among the different parts of the housing 110, as described below, and may include surface elements of the housing 110. The housing 110 may include mechanical, electrical, optical, or any other suitable subsystems, devices, components, or parts disposed within or in mechanical connection to the housing 110, including a battery 120, a charging unit 130, a controller 140, a sensor system 150 comprising one or more sensors, a communications unit 160, a one or more user input devices 170, or a one or more output devices 190. Each of the components 120, 130, 140, 150, 160, 170, and/or 190 may include one or more associated circuits, as well as packaging elements. The components 120, 130, 140, 150, 160, 170, and/or 190 may be electrically or communicatively connected with each other (e.g., via one or more busses or links, power lines, etc.), and may cooperate to enable "smart" functionality described within this disclosure.

The battery 120 may supply energy or power to the controller 140, the sensors 150, the communications unit 160, the user input devices 170, or the output devices 190. In some scenarios or implementations, the battery 120 may supply energy or power to the charging unit 130. The charging unit 130 may supply energy or power to the battery 120. In some implementations, the charging unit 130 may supply (e.g., from the charger 103, or harvested from other sources) energy or power to the controller 140, the sensors 150, the communications unit 160, the user input devices 170, or the output devices 190. In a charging mode of operation of the smart ring 101, the average power supplied by the charging unit 130 to the battery 120 may exceed the average power supplied by the battery 120 to the charging unit 130, resulting in a net transfer of energy from the charging unit 130 to the battery 120. In a non-charging mode of operation, the charging unit 130 may, on average, draw energy from the battery 120.

The battery 120 may include one or more cells that convert chemical, thermal, nuclear or another suitable form of energy into electrical energy to power other components or subsystems 140, 150, 160, 170, and/or 190 of the smart ring 101. The battery 120 may include one or more alkaline, lithium, lithium-ion and or other suitable cells. The battery 120 may include two terminals that, in operation, maintain a substantially fixed voltage of 1.5, 3, 4.5, 6, 9, 12 V or any other suitable terminal voltage between them. When fully charged, the battery 120 may be capable of delivering to power-sinking components an amount of charge, referred to herein as "full charge," without recharging. The full charge of the battery may be 1, 2, 5, 10, 20, 50, 100, 200, 500, 1000, 2000, 5000 mAh or any other suitable charge that can be delivered to one or more power-consuming loads as electrical current.

The battery 120 may include a charge-storage device, such as, for example a capacitor or a super-capacitor. In some implementations discussed below, the battery 120 may be entirely composed of one or more capacitive or charge-storage elements. The charge storage device may be capable of delivering higher currents than the energy-conversion cells included in the battery 120. Furthermore, the charge storage device may maintain voltage available to the components or subsystems 130, 140, 150, 160, 170, and/or 190 when one or more cells of the battery 120 are removed to be subsequently replaced by other cells.

The charging unit 130 may be configured to replenish the charge supplied by the battery 120 to power-sinking components or subsystems (e.g., one or more of subsystems 130, 140, 150, 160, 170, and/or 190) or, more specifically, by their associated circuits. To replenish the battery charge, the charging unit 130 may convert one form of electrical energy into another form of electrical energy. More specifically, the charging unit 130 may convert alternating current (AC) to direct current (DC), may perform frequency conversions of current or voltage waveforms, or may convert energy stored in static electric fields or static magnetic fields into direct current. Additionally or alternatively, the charging unit 130 may harvest energy from radiating or evanescent electromagnetic fields (including optical radiation) and convert it into the charge stored in the battery 120. Furthermore, the charging unit 130 may convert non-electrical energy into electrical energy. For example, the charging unit 130 may harvest energy from motion, or from thermal gradients.

The controller 140 may include a processor unit 142 and a memory unit 144. The processor unit 142 may include one or more processors, such as a microprocessor (µP), a digital signal processor (DSP), a central processing unit (CPU), a graphical processing unit (GPU), a field-programmable gate array (FPGA), an application-specific integrated circuit (ASIC), or any other suitable electronic processing components. In embodiments, the controller may include a dedicated graphics-processing unit (GPU) for rendering images, animations, characters, symbols, or any visual outputs to be presented to the user of the smart ring 101. Additionally or alternatively, the processor unit 142 may include photonic processing components (e.g., cameras, optical sensors, waveguide, optical storage, optical switches, light emitting diodes (LEDs) laser diode (LDs), etc.).

The memory unit 144 may include one or more computer memory devices or components, such as one or more registers, RAM, ROM, EEPROM, or on-board flash memory. The memory unit 144 may use magnetic, optical, electronic, spintronic, or any other suitable storage technology. In some implementations, at least some of the functionality the memory unit 144 may be integrated in an ASIC or and FPGA. Furthermore, the memory unit 144 may be integrated into the same chip as the processor unit 142 and the chip, in some implementations, may be an ASIC or an FPGA.

The memory unit 144 may store a smart ring (SR) routine 146 with a set of instructions, that, when executed by the processor 142 may enable the operation and the functionality described in more detail below. Furthermore, the memory unit 144 may store smart ring (SR) data 148, which may include (i) input data used by one or more of the components 102 (e.g., by the controller when implementing the SR routine 146) or (ii) output data generated by one or more of the components 102 (e.g., the controller 140, the sensor unit 150, the communication unit 160, or the user input unit 170). In some implementations, other units, components, or devices may generate data (e.g., diagnostic data) for storing in the memory unit 144.

The processing unit 142 may draw power from the battery 120 (or directly from the charging unit 130) to read from the memory unit 144 and to execute instructions contained in the smart ring routine 146. Likewise, the memory unit 144 may draw power from the battery 120 (or directly from the charging unit 130) to maintain the stored data or to enable reading or writing data into the memory unit 144. The processor unit 142, the memory unit 144, or the controller 140 as a whole may be capable of operating in one or more low-power mode. One such low power mode may maintain the machine state of the controller 140 when less than a threshold power is available from the battery 120 or during a charging operation in which one or more battery cells are exchanged.

The controller 140 may receive and process data from the sensors 150, the communications unit 160, or the user input devices 170. The controller 140 may perform computations to generate new data, signals, or information. The controller 140 may send data from the memory unit 144 or the generated data to the communication unit 160 or the output devices 190. The electrical signals or waveforms generated by the controller 140 may include digital or analog signals or waveforms. The controller 140 may include electrical or electronic circuits for detecting, transforming (e.g., linearly or non-linearly filtering, amplifying, attenuating), or converting (e.g., digital to analog, analog to digital, rectifying, changing frequency) of analog or digital electrical signals or waveforms.

The sensor unit 150 may include one or more sensors disposed within or throughout the housing 110 of the ring 101. Each of the one or more sensors may transduce one or more of: light, sound, acceleration, translational or rotational movement, strain, temperature, chemical composition, surface conductivity, pressure, or other suitable signals into electrical or electronic sensors or signals. A sensor may be acoustic, photonic, micro-electro-mechanical systems (MEMS) sensors, chemical, micro-fluidic (e.g., flow sensor), or any other suitable type of sensor. The sensor unit 150 may include, for example, an inertial motion unit (IMU) for detecting orientation and movement of the ring 101.

The communication unit 160 may facilitate wired or wireless communication between the ring 101 and one or more other devices. The communication unit 160 may include, for example, a network adaptor to connect to a computer network, and, via the network, to network-connected devices. The computer network may be the Internet or another type of suitable network (e.g., a personal area network (PAN), a local area network (LAN), a metropolitan area network (MAN), a wide area network (WAN), a mobile, a wired or wireless network, a private network, a virtual private network, etc.) The communication unit 160 may use one or more wireless protocols, standards, or technologies for communication, such as Wi-Fi, near field communication (NFC), Bluetooth, or Bluetooth low energy (BLE). Additionally or alternatively, the communication unit 160 may enable free-space optical or acoustic links. In some implementations; the communication unit 160 may include one or more ports for a wired communication connections. The wired connections used by the wireless communication module 160 may include electrical or optical connections (e.g., fiber-optic, twisted-pair, coaxial cable).

User input unit 170 may collect information from a person wearing the ring 101 or another user; capable of interacting with the ring 101. In some implementations; one or more of the sensors in the sensor unit 150 may act as user input devices within the user input unit 170. User input devices may transduce tactile, acoustic, video, gesture; or any other suitable user input into digital or analog electrical signal, and send these electrical signals to the controller 140.

The output unit 190 may include one or more devices to output information to a user of the ring 101. The one or more output devices may include acoustic devices (e.g., speaker, ultrasonic); haptic (thermal, electrical) devices; electronic displays for optical output, such as an organic light emitting device (OLED) display, a laser unit; a high-power light-emitting device (LED), etc.; an e-ink display (e.g., a segmented e-ink display; a matrix e-ink display, a color e-ink display; etc.), or any other suitable types of devices. For example, the output unit 190 may include a projector that projects an image onto a suitable surface. The projector may include an optical source or sources such as LEDs, LDs, OLEDs, a black body radiation source, etc. Additionally the projector may include color filters, lenses, mirrors, or other optics for projecting an image. In some implementations, the sensor unit 150, the user input unit 170; and the output unit 190 may cooperate to create a user interface with capabilities (e.g., a projection of a keyboard) of much larger computer systems; as described in more detail below.

The components 120; 130, 140, 150, 160, 170, and/or 190 may be interconnected by a bus 195; which may be implemented using one or more circuit board traces, wires, or other electrical, optoelectronic, or optical connections. The bus 195 may be a collection of electrical power or communicative interconnections. The communicative interconnections may be configured to carry signals that conform to any one or more of a variety of protocols, such as I2C, SPI, or other logic to enable cooperation of the various components.

II. Example Form Factor Types for a Smart Ring

FIG. 2 includes block diagrams of a number of different example form factor types or configurations 205a, 205b, 205c, 205d, 205e, 205f, and/or 205g of a smart ring (e.g., the smart ring 101) that may be utilized to project and further display information indicative of driving conditions to a driver, thereby improving the driver's awareness of the state of the vehicle, environment, and even his or her own state and consequently improving the driver's safety profile and reducing his or her risk exposure while driving. The system configurations 205a, 205b, 205c, 205d, 205e, 205f, and/or 205g may obtain information indicative of the driving conditions via sensors disposed on/or within the configurations, or from communicating with external devices.

The configurations 205a, 205b, 205c, 205d, 205e, 205f, and/or 205g (which may also be referred to as the smart rings 205a, 205b, 205c, 205d, 205e, 205f, and/or 205g) may each represent an implementation of the smart ring 101, and each may include any one or more of the components 102 (or components similar to the components 102). In some embodiments, one or more of the components 102 may not be included in the configurations 205a, 205b, 205c, 205d, 205e, 205f, and/or 205g. The configurations 205a, 205b, 205c, 205d, 205e, 205f, and/or 205g include housings 210a, 210b, 210c, 210d, 210e, 210f, and/or 210g, which may be similar to the housing 110 shown in FIG. 1.

The configuration 205a may be referred to as a band-only configuration comprising a housing 210a. In the configuration 205b, a band may include two or more removably connected parts, such as the housing parts 210b and 210c. The two housing parts 210b and 210c may each house at least some of the components 102, distributed between the housing parks 210b and 210c in any suitable manner.

The configuration 205c may be referred to as a band-and-platform configuration comprising (i) a housing component 210d and (ii) a housing component 210e (sometimes called the "platform 210e"), which may be in a fixed or removable mechanical connection with the housing 210d. The platform 210e may function as a mount for a "jewel" or for any other suitable attachment. In embodiments, optics for projecting images may be attached to or mounted on the platform 210e. The housing component 210d and the platform 210e may each house at least one or more of the components 102 (or similar components).

In some instances, the term "smart ring" may refer to a partial ring that houses one or more components (e.g., components 102) that enable the smart ring functionality described herein. The configurations 205d and 205e may be characterized as "partial" smart rings, and may be configured for attachment to a second ring. The second ring may be a conventional ring without smart functionality, or may be second smart ring, wherein some smart functionality of the first or second rings may be enhanced by the attachment.

The configuration 205d, for example, may include a housing 210f with a groove to enable clipping onto a conventional ring. The grooved clip-on housing 210f may house the smart ring components described above. The configuration 205e may clip onto a conventional ring using a substantially flat clip 210g part of the housing and contain the smart ring components in a platform 210h part of the housing.

The configuration 205f, on the other hand, may be configured to be capable of being mounted onto a finger of a user without additional support (e.g., another ring). To that end, the housing 210i of the configuration 205f may be substantially of a partial annular shape subtending between 180 and 360 degrees of a full circumference. When implemented as a partial annular shape, the housing 210i may be more adaptable to fingers of different sizes that a fully annular band (360 degrees), and may be elastic. A restorative force produced by a deformation of the housing 210i may ensure a suitable physical contact with the finger. Additional suitable combinations of configurations (not illustrated) may combine at least some of the housing features discussed above.

The configuration 205g may be configured to have two rings, a first ring 205g1 capable of and adapted to be mounted onto a finger of a user, and a second ring 205g2 capable of and adapted to be directly mounted onto the first ring 205g1, as depicted in FIG. 2. Said another way, the first ring 205g1 and the second ring 205g2 are arranged in a concentric circle arrangement, such that the second ring 205g2 does not contact a user's finger when the smart ring 205g is worn, Rather, only the first ring 205g1 contacts the user's finger. Each of the first and second rings 205g1 and 205g2 of the smart ring 205g may include a body having flexible material. In addition, the first ring 205g1 may include a first part, and the second ring 205g2 may include a second part removably connected to the first part.

III. Example Surface Elements of a Smart Ring

FIG. 3 includes perspective views of example configurations 305a, 305b, 305c, 305d, 305e, 305f, and/or 305g of a smart right (e.g., the smart ring 101) in which a number of surface elements are included. The surface elements may include sensors for detecting information indicative of driving conditions, or receive information indicative of driving conditions from external devices. The surface elements may also include output elements for displaying information indicative of the driving conditions to a driver.

The configuration 305a is an example band configuration 305a of a smart ring (e.g., smart ring 101). Some of the surface elements of the housing may include interfaces 312a, 312b that may be electrically connected to, for example, the charging unit 130 or the communications unit 160, On the outside of the configuration 305a, the interfaces 312a, 312b may be electrically or optically connected with a charger to transfer energy from the charger to a battery (e.g., the battery 120), or with another device to transfer data to or from the ring 305a. The outer surface of the configuration 305a may include a display 390a, while the inner surface may include a biometric sensor 350a.

Configurations 305*b* and 305*c* are examples of configurations of a smart ring with multiple housing parts (e.g., the configuration 205*b* in FIG. 2). Two (or more) parts may be separate axially (the configuration 305*b*), azimuthally (the configuration 305*c*), or radially (nested rings, not shown). The parts may be connected mechanically, electrically, or optically via, for example, interfaces analogous to the interfaces 312*a*, 312*b* in configuration 305*a*. Each part of a smart ring housing may have one or more surface elements, such as, for example, sensors 350*b*, 350*c* or output elements 390*b*, 390*c*. The latter may be projector modules or elements of projector modules (e.g., output element 390*b*) or haptic feedback devices (e.g., output element 390*c*), among other suitable sensor or output devices. Additionally or alternatively, at least some of the surface elements (e.g., microphones, touch sensors) may belong to the user input unit 170.

The configuration 305*d* may be an example of a band and platform configuration (e.g., the configuration 205*c*), while the configurations 305*e* and 305*f* may be examples of the partial ring configurations 205*d* and 205*e*, respectively. Output devices 390*d*, 390*e*, and/or 390*f* on the corresponding configurations 305*d*, 305*e*, and/or 305*f* may be LCD displays, OLE© displays, e-ink displays, one or more LED pixels, speakers, projector modules, elements of projector modules or any other suitable output devices that may be a part of a suite of outputs represented by an output unit (e.g., the output unit 190).

The configuration 305*g* is an example of a band with a one or more output devices 390*g* disposed on an outer surface 310*g* and an inner surface 311*g* of the ring band. In embodiments, the output devices 390*g* may be disposed on first and second side surfaces 308*g* and 309*g* of the ring band. Alternatively, the output devices 390*g* may be disposed within the inner and outer surfaces 310*g* and 311*g*, or the first and second side surfaces 308*g* and 309*g*, of the ring band configured to project an image to be viewed by a user of the smart ring configuration 305*g*. For example, in embodiments the outer and inner surfaces 310*g* and 311*g* or first and second side surfaces 308*g* and 309*g* may be transparent. The output devices 390*g* may be configured to project an image from the entirety of the outer surface 310*g*, the entirety of the inner surface 311*g*, the entirety of the first side surface 308*g*, or the entirety of the second side surface 309*g*. In embodiments, the output devices 390*g* may be disposed on, viewable from, or project images from only a portion of each of the surfaces 310*g*, and 390*g*, and/or 311*g*. Additionally, sensors may be operatively coupled to the configuration 305*g* (e.g., elements and sensors of the user input unit 170 of FIG. 1) to detect a user input to determine where and how an image should be projected from the output devices 390*g*. For example, a user may press a finger or stylus on the outer surface 310*g* to indicate the information should be projected from the outer surface 310*g*. Alternatively, the ring may be removed from a finger, or digit, of a user, or wearer, of the smart ring, and the user may press a finger or stylus on the inner surface 311*g* to indicate that information should be projected from the inner surface 311*g*, As such, optics of the projection from the outer surface 310*g* may provide different magnifications or have different image projection capabilities (e.g., color vs monochromatic images, higher/lower resolution images, etc.) than the projection from an inner surface 311*g*, or another output device 390*g*. A user of the configuration 305*g* may prefer information to be selectively projected from the outer or inner surfaces 310*g* and 311*g*, or the first and second side surfaces 308*g* and 309*g*, depending on the type of information, potential content of the information, a current environment where the user is viewing the information, a desired image resolution, or depending on privacy concerns among other considerations. Alternatively, a user may press on a surface to indicate where the information should not be projected from.

Elements of the user input unit 170 may be coupled to the output devices 390*g* and a user my press on a portion of the output devices 390*g* to indicate that information should be projected from the portion of the output devices 390*g* that was pressed. Additionally, a user may indicate where the output devices 390*g* should project the information dependent on different types of user inputs (e.g., audio input, a visual input such as a gesture in a projection, twisting of the ring, removal of the smart ring from a finger or digit, placement of the ring on a finger or digit, a physical orientation of the ring, a change in orientation of the ring, etc.). In embodiments, the smart ring configurations 305*a*, 305*b*, 305*c*, 305*d*, 305*e*, 305*f*, and/or 305*g* may include an inertial motion unit (IMU) for detecting the orientation and/or the movement of the ring having one of the configurations 305*a*, 305*b*, 305*c*, 305*d*, 305*e*, 305*f*, and/or 305*g*. The orientation or a change in the orientation of the smart ring configuration 305*a*, 305*b*, 305*c*, 305*d*, 305*e*, 305*f*, and/or 305*g* may be analyzed by a processor of the smart ring configurations 305*a*, 305*b*, 305*c*, 305*d*, 305*e*, 305*f*, and/or 305*g* to determine which of the output devices 390*a*, 390*b*, 390*c*, 390*d*, 390*e*, 390*f*, and/or 390*g* to project the information, or to determine a portion, or portions, of the output devices 390*a*-390*g* that are to display or project the information. In embodiments, the output devices 390*a*, 390*b*, 390*c*, 390*d*, 390*e*, 390*f*, and/or 390*g* may display or project an indication of a message or information that is ready to be presented to a user. The user may then provide the user input to the smart ring, based at least in part upon the indication, to indicate which output device 390*g* should display or project the information, and/or what portion of the output device should display or project the information. Enabling the user to indicate a portion of the display for displaying or projecting information may be useful in a number of contexts. For example, this feature enables a user to selectively view information at a time and on a surface (e.g., on the windshield of a car, or on a table or other surface) when he or she alone can view the information, thus providing the user with privacy he or she might not otherwise have. Further, in some embodiments, the band may have a display or projector module that occupies a significant portion of the outer band. In such embodiments, portions of the display or projector module may not be viewable by the user (e.g., because those portions may be viewable only from the palm-side of the hand). Thus, in such embodiments it may be advantageous to enable the user to indicate a desired portion for display or projecting the information (e.g., a portion of the display or projector module that projects an image viewable from the back-side of the hand).

IV. Example Smart Ring Projector Module Displays

Staying with FIG. 3, the output devices 390*a*, 390*b*, 390*c*, 390*d*, 390*e*, 390*f*, and/or 390*g* may be projector modules for projecting images and information indicative of one or more driving conditions identified by the smart ring. The projector modules may be configured to project color images, black and white images, monochromatic images, animations, characters, symbols, or other types of images and information.

The output devices 390*a*, 390*b*, 390*c*, 390*d*, 390*e*, 390*f*, and/or 390*g* may project images, characters, symbols, or other visual outputs to convey information indicative of driving conditions to a user of a smart ring. For example, the output devices 390*a*, 390*b*, 390*c*, 390*d*, 390*e*, 390*f*, and/or 390*g* may change visual output to indicate a low battery charge level, or other malfunction, of the smart ring. Additionally, projector modules of the output devices 390*a*, 390*b*, 390*c*, 390*d*, 390*e*, 390*f*, and/or 390*g* may be configured to display or project any visual indication (e.g., a character, a word, a sentence, a symbol, an image, a color, a brightness level, an animation, a photographic image, etc.) to indicate any type of operation or status of the smart ring. For example, the output devices 390*a*, 390*b*, 390*c*, 390*d*, 390*e*, 390*f*, and/or 390*g* may display or project visual indications based at least in part upon the battery level of the smart ring, an incoming communication being received by the smart ring, an outgoing communication being sent from the smart ring, an active or inactive communicative link between the smart ring and an external device, etc.

In embodiments, the output devices 390*a*, 390*b*, 390*c*, 390*d*, 390*e*, 390*f*, and/or 390*g* may display or project visual indications representative of detected biometrics of a user of the smart ring. For example, the smart ring may detect the pulse of a user of the smart ring, and the output devices 390*a*, 390*b*, 390*c*, 390*d*, 390*e*, 390*f*, and/or 390*g* may display or project the color red, a specific image, or an animation if the detected pulse rate is above a maximum pulse rate threshold or below a minimum pulse rate threshold, and the output devices 390*a*, 390*b*, 390*c*, 390*d*, 390*e*, 390*f*, and/or 390*g* may project the color green, a different specific image, or another animation if the detected pulse rate is between the maximum and minimum pulse rate thresholds. Alternatively or additionally, the output devices 390*a*, 390*b*, 390*c*, 390*d*, 390*e*, 390*f*, and/or 390*g* may display or project the numerical value of the detected pulse rate. Projector modules of the output devices 390*a*, 390*b*, 390*c*, 390*d*, 390*e*, 390*f*, and/or 390*g* may project a visual indication of information indicative of a pulse rate, blood flow, blood oxygen level, blood pressure, skin salinity level, temperature, weariness level, a cognoscente condition of the user, an inebriation condition of the user, or any other biological and biometric information to a user of the smart ring. Additionally, the ring may project images and indications of a state of a user such as erratic behavior of the sure, sleepiness of the user, stress level of the user, etc.

In embodiments, the output devices 390*a*, 390*b*, 390*c*, 390*d*, 390*e*, 390*f*, and/or 390*g* may display or project a visual indication dependent on detected vehicular statuses. For example, the smart ring may communicate with sensors of a vehicle, with a communication module of the vehicle, or with another device or network to obtain current statuses of the vehicle and parts of the vehicle. For example, the output devices 390*a*, 390*b*, 390*c*, 390*d*, 390*e*, 390*f*, and/or 390*g* may display or project a low fuel graphic or image to indicate that the gas in the tank of a vehicle is below a minimum threshold. The output devices may similarly display or project a graphic or image to indicate that the heat of the engine of the vehicle is too high or a tire of the vehicle has an air pressure below a threshold. Additionally, the output devices may display or project a visual indication to present information to the user indicative of an oil level, needed oil change, coolant level, exhaust fume legal compliance, break pad health, low battery charge, flat tire, alternator failure, tire alignment/misalignment, transmission issue, power steering fluid level, brake fluid level, transmission fluid level, windshield wiper fluid level, etc.

In embodiments, the output devices 390*a*, 390*b*, 390*c*, 390*d*, 390*e*, 390*f*, and/or 390*g* may display or project a visual indication dependent on vehicular operations. For example, the smart ring may communicate with sensors of the vehicle, with a communication module of the vehicle, or with another device or network to obtain a current speed of the vehicle. The output devices 390*a*, 390*b*, 390*c*, 390*d*, 390*e*, 390*f*, and/or 390*g* may project the numerical value of the speed (e.g., 32), or a graphic or color indicating that speed of the vehicle is above a maximum speed threshold or below a minimum speed threshold, and the output devices 390*a*, 390*b*, 390*c*, 390*d*, 390*e*, 390*f*, and/or 390*g* may present a different graphic or color if the detected speed is between the maximum and minimum speed thresholds. In embodiments, the output devices 390*a*, 390*b*, 390*c*, 390*d*, 390*e*, 390*f*, and/or 390*g* may display or project visual indications to present to a user information indicative of a speed of a vehicle, an acceleration of a vehicle, a current altitude of the vehicle, the lane centering of the vehicle, a fuel efficiency of the vehicle, an autopilot function status of the vehicle (e.g., autopilot is activated/not-activated), an autonomous driving function of the vehicle is operational, an autonomous driving function of the vehicle is activated, air bags are activated/de-activated, a seat belt is latched/unlatched, a temperature of the environment inside of the cabin of the vehicle, etc.

In embodiments, the output devices 390*a*, 390*b*, 390*c*, 390*d*, 390*e*, 390*f*, and/or 390*g* may display or project a visual indication dependent on external factors or environmental factors in, and around, the vehicle. For example, the smart ring may communicate with sensors of the vehicle, with a communication module of the vehicle, with communication modules of other nearby vehicles, with a mobile device of the user of the smart ring, or with another device or network to obtain information and statuses of nearby vehicles. For example, it may be communicated to the smart ring that a nearby driver is driving erratically, and the smart ring may display or project a warning message, a graphic, or the color red to indicate that the driver (e.g., the user of the smart ring device) should be cautious. Additionally, the output devices may display or project visual indications, signals, and information indicative of current or predicated weather conditions (e.g., rain, snow, extreme heat, etc.), current external environmental conditions (e.g., wet/slick roads, fog levels, a visibility level, dangerous breathing air, external temperature, etc.), current conditions inside of the cab of the vehicle (e.g., the temperature, air quality, moisture level, etc.).

In embodiments, the output devices 390*a*, 390*b*, 390*c*, 390*d*, 390*e*, 390*f*, and/or 390*g* may output visual indications and signals to indicate many driving conditions during operation of a vehicle such as the congestion of drivers along a road or planned trip route, the current proximity of the vehicle to external objects outside of the vehicle (e.g., other vehicles, pedestrians, trees, etc.), or other factors associated with operation of a vehicle.

The output devices 390*a*, 390*b*, 390*c*, 390*d*, 390*e*, 390*f*, and/or 390*g* may display or project visual indications to a user of a smart ring, any number of driving conditions as described above. Driving conditions may be considered to be any element or factor that may have an influence or impact on the operation of a vehicle. For example, the weariness of an operator of the vehicle may be considered to be a driving condition, as well as the visibility of a road due to a rainstorm. The driving conditions may include one or more of the examples above including, without limitation, any operation of a vehicle, status of a vehicle or part of a vehicle, biometric of a user of the smart ring, operation of the smart ring, status of the smart ring, external environmental factors, and external driving factors. Additionally, it is envisioned, that the user of the smart ring may be a driver of a vehicle and the biometric information may be used to determine the sleepiness of the driver, inebriation condition of the driver, or otherwise, cognoscente condition of the driver.

While described above as "displaying or projecting visual indications", the output devices 390a, 390b, 390c, 390d, 390e, 390f, and/or 390g may provide other visual signals or outputs indicative of driving conditions. For example, the output devices 390a, 390b, 390c, 390d, 390e, 390f, and/or 390g may each portray information to a user through flashes or optical pulses projector module, presenting images, characters, or symbols by the projector module, or presenting whole sentences and messages via the projector module. The output devices 390a, 390b, 390c, 390d, 390e, 390f, and/or 390g may include one or more projector modules for projecting characters or symbols, and scrolling of characters or symbols, as described in simultaneous reference to FIG. 3, FIG. 4A, FIG. 4B, FIG. 4C, and/or FIG. 5.

V. An Example Smart Ring Projector Module for Displaying Information

FIG. 4A, FIG. 4B, FIG. 4C, and FIG. 4D are example illustrations of smart ring devices 480a, 480b, 480c, and/or 480d with output devices, such as any of the output devices 490a, 490b, 490c, 490d, 490e, 490f, and/or 490g, having a smart ring projector modules 482a, 482b, 482c, and/or 482d for projecting characters, symbols, images, and animations indicative of driving conditions identified by the smart ring devices 480a, 480b, 480c, and/or 480d. The projector modules 490a, 490b, 490c, and/or 490d, each include optical sources 492a, 492b, 492c, and/or 492d and projection optics 494a, 494b, 494c, and/or 494d. The optical sources 492a, 492b, 492c, and/or 492d are configured to provide optical energy to the projection optics 494a, 494b, 494c, and/or 494d, for the projection optics 494a, 494b, 494c, and/or 494d to project an image, visible character, symbol, or other visual indication of information pertaining to driving conditions, onto a surface. In embodiments, the optical sources 492a, 492b, 492c, and/or 492d may include LEDs, LDs, OLEDs, a black body source, a monochromatic optical source, or other sources of optical energy. In embodiments, the projection optics 494a, 494b, 494c, and/or 494d may include one or more of a bandpass filter, an edge pass filter, a colored glass, a spectral filter, a neutral density filter, a multivariate optical element, a tunable optical filter, a spatial filter, a diffraction grating, a lens, an aperture, or another optical element for projecting an image. The projection optics 494a, 494b, 494c, and/or 494d may be any optical elements for manipulating optical energy for the imaging of information indicative of driving conditions. In embodiments, the projector modules 480a, 480b, 480c, and/or 480d may be configured to project on a multitude of surfaces such as a dashboard of a vehicle, a front windshield of a vehicle, a window of a vehicle, a ceiling of the inside of a cab of a vehicle, a table, a designated surface for displaying the information, or another surface for a projection to display information to a driver.

Figure 4A:
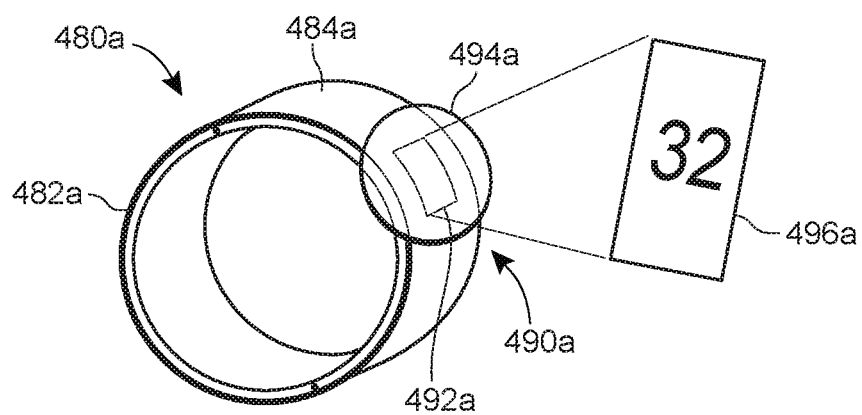
FIG. 4A, FIG. 4B, FIG. 4C, and FIG. 4D are illustrations of output devices with projector modules for displaying information according to some embodiments.

The smart ring device 480a of FIG. 4A is an example of a smart ring device having the projector module 490a entirely on an outer surface 484a of a ring band 482a of the smart ring device 480a, The optical source 492a is disposed on, or inside of, the outer surface 484a. The projection optics 494a are disposed on the outer surface 484a, or on the optical source 492a configured to project the optical energy provided by the optical source onto a surface 496a to form an image, visible character, symbol, or other visual information indicative of driving conditions.

Figure 4B:
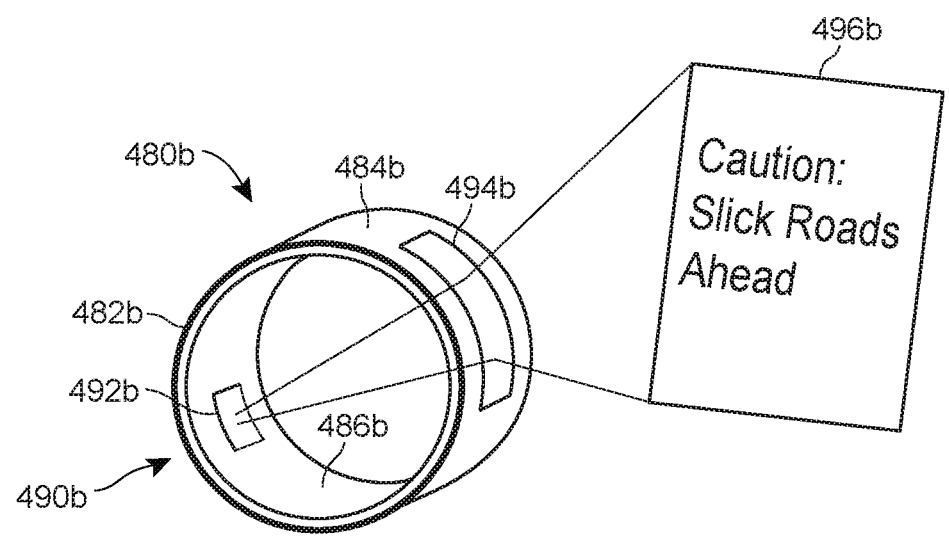

In another embodiment, as illustrated in FIG. 4B, the smart ring device 480b may include a projector module 492b that has the optical source 492b disposed on, or inside of, an inner surface 486b of a ring band 482b. The projection optics 494b may be disposed on, or within the ring band 482b away from the optical source 492b to receive optical energy from the optical source 492b to project an image, character, symbol, or other visual information indicative of driving conditions, onto a surface 496b. The smart ring device 480b of FIG. 4B may further include projection optics disposed on top of the optical source 492b, or on the inner surface 486b of the ring band to receive the optical energy from the optical source 492b before the optical energy is provided to the projection optics 494b disposed on, or inside of, the ring band 482b.

Figure 4C:
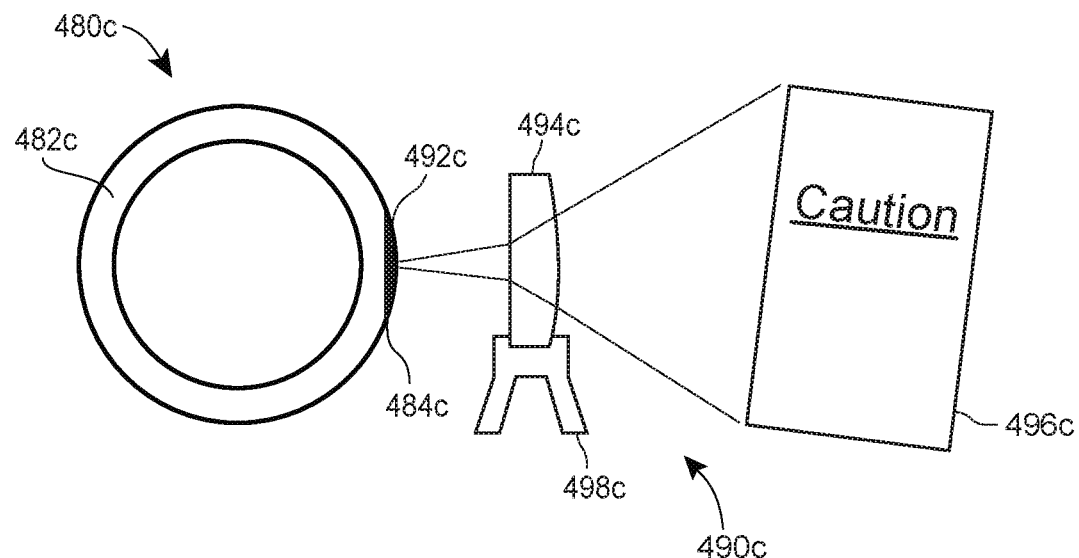

In yet another embodiment, illustrated in FIG. 4C, the smart ring device 480c may include a projector module 490c with the optical source 492c disposed on, of inside of, an outer surface 484a of a ring band 482c of the smart ring device 480c. The projection optics 494c may be physically independent from the ring band 482c, and be spatially configured to project an image, character, symbol, or other visual information indicative of driving conditions, onto a surface 496c. The projection optics 494c may be held by a mount 498c or other structure for mounting the projection optics 494c. The mount 498c may be a stand, a clamp, a mirror mount, a lens mount, an optical rotatable mount, a motorized mount, a prism mount, a filter mount, a diffraction grating mount, or another mount capable of mounting the projection optics 494c.

Figure 4D:
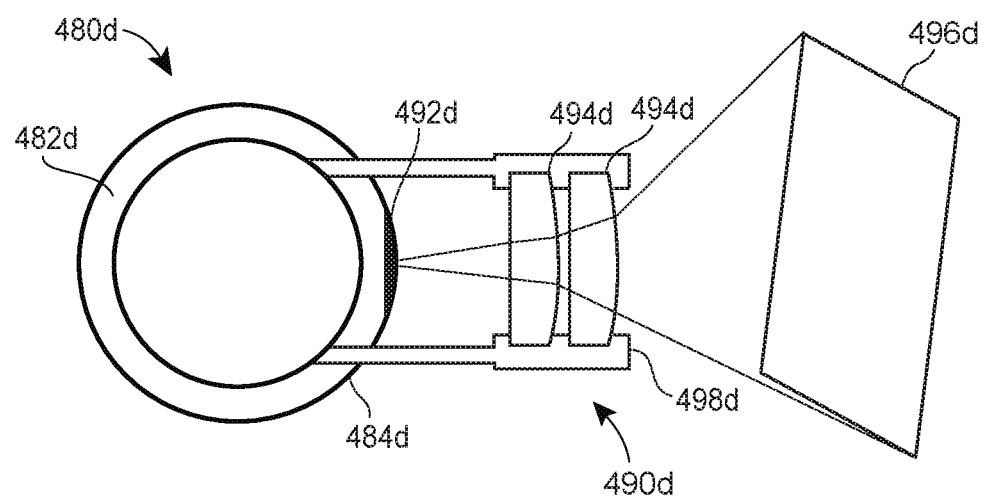

In still another embodiment, illustrated in FIG. 4D, the smart ring device 480d may include a projector module 490d with the optical source 492d disposed on, or inside of, an outer surface 484d of a ring band 482d. The projection optics 494d may be positioned by a mount 498d relative to the optical source to project an image, character, symbol, or other visual information indicative of driving conditions, onto a surface 496d. The mount 498d may be coupled to the ring band 482d and may be removable from the ring band 482d. The mount 498d may be capable of mounting multiple optical elements of the projection optics 494d for projecting the image. In embodiments, the mount 498d may be part of a housing component (e.g., the housing component 210e of FIG. 3) or may be attachable to a platform (e.g., the platform 210h of FIG. 3).

In envisioned embodiments, a projector module may project images, or visual images indicative of driving conditions from a side surface of a smart ring device (e.g., the first and second side surfaces 308g and 309g of FIG. 3). For example, LEDs or LDs may be disposed on side surfaces to display an image of a circle that changes color dependent on driving conditions. A portion of a circle may be displayed to indicate speed (e.g., a speedometer) or another gauged value or measurement. In embodiments, projection modules configured to project visual information indicative of driving conditions may include projection optics, or may not include projection optics when a laser or LDs.

The projector modules 490a, 490b, 490c, and/or 490d may display characters, symbols, words, or sentences, to a user of a smart ring device. For example, as illustrated in FIG. 4A, the projector module 490a may project numerals (e.g., "32") that may be indicative of a speed of a vehicle, a number of miles traversed during operation of a vehicle, the number of miles left to get to a destination of a vehicle, biometric information of a wearer of the smart ring device, or another metric or other information as described herein. As illustrated in FIG. 4B, the projector module 490*b* may project a caution message that reads "Caution: Slick Roads Ahead." The message may be too long to display at one time on the surface 496*b*. The output device 490 may then display characters, symbols, words, and/or sentences sequentially in frames, for example, as illustrated in FIG. 4C, displaying the word "Caution" for a few seconds, and then displaying a new frame with the words "Slick Roads Ahead," (not illustrated in FIG. 4C).

Displaying messages in frames allows for the projector modules 490*a*, 490*b*, 490*c*, and/or 490*d* to display longer messages, but may not be suitable for smooth reading of entire sentences or text messages. Therefore, the projector modules 490*a*, 490*b*, 490*c*, and/or 490*d* may display information in the form of a message in a manner that the message is scrolled across the surfaces 496*a*, 496*b*, 496*c*, and/or 496*d*. The projector modules may project and scroll any characters, symbols, sentences, colors, images, or messages indicative of one or more driving conditions as described above.

Additionally, the projector modules 490*a*, 490*b*, 490*c*, and/or 490*d* may display (e.g., by way of scrolling) a symbol or series of symbols, such as a happy face, thumbs up, check mark, or other symbol that may be indicative of a driving condition. For example, a smart ring device may attempt to establish a communication link with a mobile device of the user of the smart ring device, or with a communications module of a vehicle being driven by the user of the smart ring device. The projector modules 490*a*, 490*b*, 490*c*, and/or 490*d* may display a check mark to indicate that the communication link has been successfully established.

FIG. 5 is a flow diagram of a method 550 for controlling the scrolling of information across a projection surface via projection from a projector module, such as by the projector modules 490*a*, 490*b*, 490*c*, and/or 490*d* across corresponding surfaces 496*a*, 496*b*, 496*c*, and/or 496*d* as illustrated in FIG. 4A, FIG. 4B, and/or FIG. 4C. Scrolling of information and controlling the scrolling of information allow for more information to be displayed or projected by an output device of a smart ring. Additionally, scrolling of information allows for output devices of a smart ring to display longer messages, whole sentences, and other indications of information that may not fit onto a display of an output device. In embodiments, a controller or a processor may be configured to control the scrolling of the information projected by an output device, such as the projector modules 490*a*, 490*b*, 490*c*, and/or 490*d*.

In embodiments, a processor of the smart ring including a projector module may be configured to cause the projector module to scroll the information across a surface according to user inputs received at the smart ring. The user inputs may cause the processor to initiate scrolling, halt scrolling, increase the speed of the scrolling, or decrease the speed of the scrolling, among other potential scrolling commands and functionalities.

At block 552, the smart ring receives, at a user input unit such as the user input unit 170, an initial user input to initiate the scrolling of projected information. In embodiments, the user input unit 170 may include a haptic sensor, a microphone or audio sensor, an optical sensor, a pressure sensor, an accelerometer, a button, a switch, an orientation sensor that detects the physical orientation of the smart ring, or another sensor. In embodiments, the user input may include a haptic input, audio input (e.g., audio command from a user), a current physical orientation of the smart ring, a change in orientation of the smart ring, an activation of a button, an activation of a switch, a captured image (e.g., an image of a user looking at the smart ring), etc. At block 554, the smart ring initiates the scrolling of the projected information.

After initiation of the scrolling of the projected information, the user input unit 170 may receive a secondary user input at block 556, a tertiary user input at block 558, or a halting user input at block 560. At block 562, the processor may cause the projector module to increase the scrolling speed of the projected information in response to receiving the secondary user input at block 556. Alternatively, at block 564, the processor may cause the projector module to decrease the scrolling speed in response to receiving the tertiary user input at block 558. Additionally, at block 564, the processor may cause the projector module to halt the scrolling in response to receiving the halting user input at block 560. At block 568, the processor checks to see if an end condition has been met. The end condition may include the scrolling of the entire message or projected information, a change in orientation of the smart ring device, a sensor input (e.g., imaging of a user face observing/not observing the output device 490, haptic input such as clenching of a fist, rotation of ring, a change in the orientation of the smart ring, etc.), a timing out of a display time for the projected information, etc. At block 568, if the terminating condition has been met, the processor may cause the projector module to stop presenting the information and may cause the smart ring device to resume previous displays projected by the projector module, or may cause the projector module to display other messages, images, or projected information. Otherwise, if the terminating condition has not been met, the current scrolling state (e.g., speeding up the scrolling, halting of the scrolling, etc.) may be applied and the projected information may continue to scroll, or otherwise be displayed, and further user inputs may be received by the user input unit 170.

Additionally, the method 500 may include a block or step (not shown) in which a terminating user input is received by the user input unit 170 at any time during the method 500. The terminating user input may cause the processor to directly proceed to block 570, thereby ending implementation of the method 500.

Examples of each of the secondary, tertiary, and halting user inputs include: a haptic input, audio input (e.g., audio command from a user), a current physical orientation of the smart ring, a change in orientation of the smart ring, an activation of a button, an activation of a switch, a captured image (e.g., an image of a user looking at the smart ring), etc. Each of the user inputs may be dependent on a current state of the scrolling (e.g., a currently halted scrolling, a current speed of the scrolling, etc.). Additional functionalities are also envisioned such as a rewinding of the scrolling allowing a user of the smart ring device to review information that has already scrolled off of the projection.

In embodiments, the output unit 190 of FIG. 1, the output devices 390*a*, 390*b*, 390*c*, 390*d*, 390*e*, 390*f*, and/or 390*g*, and/or the output device 490, may include LEDs as optical sources for projector modules, and may be configured to illuminate the LEDs in specific patterns, generating an optical signal, to transmit information from a smart ring to another device or system. For example, the LEDs may generate optical pulses that transmit bits of information to an optical sensor to identify a user of the smart ring. In other examples, a projector module of the output units 190 may display coded information such as a UPC code, QR code, 2D barcode, PDF417 code, AZTEC code, or another coded image or graphic to transmit information to an optical sensor to identify a user of the smart ring. One specific example includes communication, via an image or optical output from the output unit 190 or output devices 390*a*, 390*b*, 390*c*, 390*d*, 390*e*, 390*f,* and/or 390*g,* the identification of a wearer of the smart ring to a smart lock or electronic lock of a vehicle. The optical signal received by the electronic lock may unlock the door depending on a confirmed identification of the wearer of the smart ring being an approved driver of the vehicle. Another example includes identifying the wearer of the smart ring to provide permissions to the wearer to operate a vehicle, to obtain statuses of the vehicle parts (e.g., engine performance information, coolant levels, etc.), to obtain a list or timestamped list of previous drivers of the vehicle, to obtain a history of maintenances performed on a vehicle, etc. Permissions may include providing access to an account associated with the wearer of the ring to transmit data and information from the smart ring device to a device (e.g., cellular device, network, laptop, etc.) accessing the account associated with the wearer of the smart ring, or to transmit data and information from a device accessing the account associated with the wearer of the smart ring to the smart ring device. The optical signal (e.g., captured image, optical pulse, etc.) may be used to identify a user for logging into devices and computers, determining permissions to enter a room, permissions to open a cabinet or closet, identification and permissions at a medical facility, identification and permissions at an educational institution, clocking into/out of a work place, and identification for operation of a vehicle, among other identification purposes. The output unit 190 and output devices 390*a*, 390*b*, 390*c*, 390*d*, 390*e*, 390*f,* and/or 390*g*, and projector modules 490*a*, 490*b*, 490*c*, and/or 490*d* may be configured to provide the optical signal (e.g., image, graphic, optical pulse, encoded optical image or signal, etc.) to an optical fiber, optical waveguide, photodiode, avalanche photodiode, charge-coupled device, photoresistor, photomultiplier, imaging camera, or other optical sensor. Additionally, the optical signal provided by the output unit 190 may include one or more signal modulations including, but not limited to, on-off keying, amplitude shift keying, frequency shift key, binary phase shift keying, phase modulations, amplitude modulation, spatial modulations, polarization modulation, or a quadrature amplitude modulation.

It should be appreciated that a variety of suitable surface elements may be disposed at the illustrated configurations 305*a*, 305*b*, 305*c*, 305*d*, 305*e*, 305*f,* and/or 305*g* at largely interchangeable locations. For example, the output elements 390*d*, 390*e*, and/or 390*f* may be replaced with sensors (e.g., UV sensor, ambient light or noise sensors, etc.), user input devices (e.g., buttons, microphones, etc.), interfaces (e.g., including patch antennas or optoelectronic components communicatively connected to communications units), or other suitable surface elements.

VI. Examples of Optical User Inputs

In some implementations, a smart ring device may include a sensor unit, user input unit, and an output unit such as the smart ring 101 of the system 101 of FIG. 1. The user input unit 170 may cooperate with the output unit 190 to create a virtual user interface with capabilities of much larger computer systems. For example, the output unit 190 may include a projector module that projects a virtual keyboard onto a surface. A user may then type on the virtual keyboard and an optical sensor of the user input unit 170 may receive the user input via an optical signal provided by the typing on the virtual keyboard. The optical sensor may include a camera, a CCD sensor, a photodiode, or another type of optical sensor. Additionally, the output unit 190 project a web browser interface and a user may touch the projected icons, links, or a menu selection to interact with the website and web browser.

In embodiments, the output unit 190 may display or project a login screen needing a user login and user verification. In embodiments, the login and verification may be typed onto a virtual keyboard as described above. In other embodiments, either or both of the user login and verification may be a physical gesture performed by the user and received by an optical sensor of the user input unit 170. For example, a virtual use handshake with a sequence of multiple hand gestures may constitute the user login and/or verification. For example, sign language may be used as a visual input to act as the user input to the user input unit 170. The out unit 190 may display a security question needing a specific answer to be entered via a virtual keyboard or by other means as described herein. In embodiments, the user input may include one or more of a hand gesture, a hand movement, an input performed by a stylus, a gesture performed on a surface with a projection on the surface, with another virtual interaction with a projection, or another optical input or virtual projection based interaction. In embodiments, the user input may identify a user of a smart ring device, identify a driver of a vehicle, provide a user with permissions to devices and locations as described elsewhere herein, allow a user to manipulate and edit documents, navigate websites, control scrolling of information, view images, or control the projection of images and information to instruct the output unit to display where to, or where not to, project the information, among other envisioned commands and input purposes.

VII. Example Displays

FIG. 6 illustrates a set of example display devices 500 according to various embodiments, including example displays 500*a*, 500*b*, 500*c*, 500*d*, 500*e*, and/or 500*f* that may be provided by way of a smart ring such as the smart ring 101 of FIG. 1, ring configurations 305*a*, 305*b*, 305*c*, 305*d*, 305*e*, 305*f*, and/or 305*g* of FIG. 3, or smart ring devices 480*a*, 480*b*, 480*c*, and/or 480*d* of FIG. 4A, FIG. 4B, FIG. 4C, and FIG. 4D, for the purpose of displaying information relevant to monitored sleep patterns, predicted risk exposure, and a remediating action to restore or eliminate risk exposure (e.g., providing a user notification). Each of the display devices 500 may be part of the system 100 shown in FIG. 1, and each may be utilized in place of or in addition to any one or more of the display devices shown in FIG. 1. Each display device 500 may be similar in nature to any of the display devices of ring 405, user device 422, mobile device 444 as shown in FIG. 7, or vehicle 546 shown in FIG. 6, capable of performing similar functions and interfacing with the same or similar systems; and each of the devices 101, 405, 422, 444, and 546 may provide output via any of the displays 500*a*, 500*b*, 500*c*, 500*d*, 500*e*, and/or 500*f,* in addition to or in place of their respective displays, if desired.

In an embodiment, the display devices 500 may display the level of driving risk exposure data (e.g., as a score, a figure, a graph, a symbol, or a color field, etc.) and the suggested remediating actions (e.g., as a written text, a code, a figure, a graph, or a symbol, etc.). Examples of remediating actions will be described later in more detail. More generally, each of the display devices 500 may present visual information based at least in part upon data received from any of the devices 405, 422, 444, 446, or the server 450 shown in FIG. 4.

As shown, the display device 500a is a screen of a mobile phone 522 (e.g., representing an example of the mobile device 422) that may be coupled to the smart ring 405. The display device 500b is an in-dash display of a vehicle 546 (e.g., representing an example of a display integrated into the dash or console of the vehicle 446) that may be coupled to the smart ring 405. The display device 500c is a projector for smart ring 505 (e.g., representing an example of the smart ring 405), which could be part of the ring output unit 190 and its example output devices 390d, 390e, and/or 390f. The display device 500d is a heads-up display (HUD) for a vehicle (e.g., the vehicle 446) projected onto a windshield 517, which may also communicate with the smart ring 405 via the network 440. Alert 518 is a sample alert, which may display to the user any combination of a predicted level of driving risk exposer (e.g., driving risk score) and a suggested remediating action. The display device 500e is a screen for a tablet 544 (e.g., representing an example of the mobile device 444, which may communicate with the smart ring 405). The display device 500f is a screen for a laptop 521 (e.g., representing an example of the mobile device 444, which may communicate with the smart ring 405) that may be coupled to the smart ring 405.

VIII. Example Devices with which a Smart Ring May Interact

FIG. 7 illustrates an example environment 400 within which a smart ring 405 including a projector module, such as the projector modules 490a, 490b, 490c, and/or 490d, may be configured to operate. Elements of the environment 400 may obtain information indicative of driving conditions, communicate them to the smart ring 405, and the smart ring 405 may display information indicative of the driving conditions via output elements of the smart ring (e.g., a projector module). In an embodiment, the smart ring 405 may be the smart ring 101. In some embodiments, the smart ring 405 may be any suitable smart ring capable of providing at least some of the functionality described herein. Depending on the embodiment, the smart ring 405 may be configured in a manner similar or equivalent to any of the configurations 205a, 205b, 205c, 205d, 205e, and/or 205f or 305a, 305b, 305c, 305d, 305e, and/or 305f shown in FIG. 2 and FIG. 3.

The smart ring 405 may interact (e.g., by sensing, sending data, receiving data, receiving energy) with a variety of devices, such as bracelet 420 or another suitable wearable device, a mobile device 422 (e.g., a smart phone, a tablet, etc.) that may be, for example, the user device 104, another ring 424 (e.g., another smart ring, a charger for the smart ring 405, etc.), a secure access panel 432, a golf club 434 (or another recreational accessory), a smart ring 436 worn by another user, or a steering wheel 438 (or another vehicle interface). Additionally or alternatively, the smart ring 405 may be communicatively connected to a network 440 (e.g., WiFi, 5G cellular), and by way of the network 440 (e.g., network 105 in FIG. 1) to a server 442 (e.g., server 107 in FIG. 1) or a personal computer 444 (e.g., mobile device 106). Additionally or alternatively, the ring 405 may be configured to sense or harvest energy from natural environment, such as the sun 450.

The ring 405 may exchange data with other devices by communicatively connecting to the other devices using, for example, the communication unit 160. The communicative connection to other device may be initiated by the ring 405 in response to user input via the user input unit 170, in response to detecting trigger conditions using the sensor unit 150, or may be initiated by the other devices. The communicative connection may be wireless, wired electrical connection, or optical. In some implementation, establishing a communicative link may include establishing a mechanical connection. The ring 405 may display or otherwise convey to a user of the ring 405 information or data received from any devices communicatively coupled to the ring 405, and more specifically data indicative of one or more driving conditions as described herein.

The ring 405 may connect to other devices (e.g., a device with the charger 103 built in) to charge the battery 120. The connection to other devices for charging may enable the ring 405 to be recharged without the need for removing the ring 405 from the finger. For example, the bracelet 420 may include an energy source that may transfer the energy from the energy source to battery 120 of the ring 405 via the charging unit 430. To that end, an electrical (or optical) cable may extend from the bracelet 420 to an interface (e.g., interfaces 112a, 112b, 312a, 312b) disposed at the housing (e.g., housings 110, 210a, 210b, 210c, 210d, 210e, 210f, 210g, 210h, and/or 210i) of the ring 405. The mobile device 422, the ring 424, the golf club 434, the steering wheel 438 may also include energy source configured as chargers (e.g., the charger 103) for the ring 405. The chargers for may transfer energy to the ring 405 via a wired or wireless (e.g., inductive coupling) connection with the charging unit 130 of the ring 405.

IX. Examples of Other Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present disclosure has been described with reference to specific examples, which are intended to be illustrative only and not to be limiting of the present disclosure, it will be apparent to those of ordinary skill in the art that changes, additions or deletions may be made to the disclosed embodiments without departing from the spirit and scope of the present disclosure.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification may not be all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements may not be limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or an are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

X. General Terms and Phrases

Throughout this specification, some of the following terms and phrases are used.

Bus according to some embodiments: Generally speaking, a bus is a communication system that transfers information between components inside a computer system, or between computer systems. A processor or a particular system (e.g., the processor 454 of the server 450) or subsystem may communicate with other components of the system or subsystem (e.g., the components 452 and 456) via one or more communication links. When communicating with components in a shared housing, for example, the processor may be communicatively connected to components by a system bus. Unless stated otherwise, as used herein the phrase "system bus" and the term "bus" refer to: a data bus (for carrying data), an address bus (for determining where the data should be sent), a control bus (for determining the operation to execute), or some combination thereof. Depending on the context, "system bus" or "bus" may refer to any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Communication Interface according to some embodiments: Some of the described devices or systems include a "communication interface" (sometimes referred to as a "network interface"). A communication interface enables the system to send information to other systems and to receive information from other systems, and may include circuitry for wired or wireless communication.

Each described communication interface or communications unit (e.g., communications unit 160) may enable the device of which it is a part to connect to components or to other computing systems or servers via any suitable network, such as a personal area network (PAN), a local area network (LAN), or a wide area network (WAN). In particular, the communication unit 160 may include circuitry for wirelessly connecting the smart ring 101 to the user device 104 or the network 105 in accordance with protocols and standards for NFC (operating in the 13.56 MHz band), RFID (operating in frequency bands of 125-134 kHz, 13.56 MHz, or 856 MHz to 960 MHz), Bluetooth (operating in a band of 2.4 to 2.485 GHz), Wi-Fi Direct (operating in a band of 2.4 GHz or 5 GHz), or any other suitable communications protocol or standard that enables wireless communication.

Communication Link according to some embodiments: A "communication link" or "link" is a pathway or medium connecting two or more nodes. A link between two end-nodes may include one or more sublinks coupled together via one or more intermediary nodes. A link may be a physical link or a logical link. A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media according to some embodiments: Generally speaking, as used herein the phrase "memory" or "memory device" refers to a system or device (e.g., the memory unit 144) including computer-readable media ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information, and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network according to some embodiments: As used herein and unless otherwise specified, when used in the context of system(s) or device(s) that communicate information or data, the term "network" (e.g.; the networks 105 and 440) refers to a collection of nodes (e.g., devices or systems capable of sending, receiving or forwarding information) and links which are connected to enable telecommunication between the nodes.

Each of the described networks may include dedicated routers responsible for directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. If desired, each described network may include networks or sub-networks, such as a local area network (LAN) or a wide area network (WAN).

Node according to some embodiments: Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor according to some embodiments: The various operations of example methods described herein may be performed, at least partially, by one or more processors (e.g., the one or more processors in the processor unit 142). Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A smart ring device for displaying information indicative of driving conditions to a driver, the smart ring device comprising:
   a ring band;
   a processor disposed within the ring band and configured to analyze data to identify one or more driving conditions;
   a projector module disposed at least partially within the ring band and communicatively coupled to the processor; and
   a user input unit comprising one or more optical sensors disposed at least partially within the ring band, wherein:
      the one or more optical sensors are configured to receive a user input indicating a hand gesture;
      the user input unit is communicatively coupled to the processor; and
      the processor is configured to cause the projector module to present information indicative of the one or more driving conditions, as identified, based at least in part on the hand gesture.

2. The smart ring device of claim 1, wherein the processor is further configured to cause the projector module to scroll the presented information on a projection surface based on the user input.

3. The smart ring device of claim 2, further comprising, wherein the processor is further configured to, based on the user input, cause the projector module to initiate scrolling, halt scrolling, increase a speed of scrolling, decrease a speed of scrolling, or rewind scrolling.

4. The smart ring device of claim 1, wherein the user input is a second user input, wherein the user input unit is further configured to receive a first user input, and wherein the processor is configured to verify a user based on the first user input.

5. The smart ring device of claim 1, wherein the user input further includes at least one of an orientation of the ring band, a hand movement, an input performed by a stylus, a captured image, an activation with a button, an activation of a switch, a gesture performed on a surface of a projection, or a virtual interaction with the projection.

6. The smart ring device of claim 1, wherein the projector module comprises:
an optical source configured to emit optical energy; and
one or more projection optics configured to project the optical energy, as emitted, from the optical source onto a surface to display information indicative of the one or more driving conditions.

7. The smart ring device of claim 6, wherein the optical source is disposed such that the optical energy, as emitted, is emitted from an inner surface of the smart ring device, and at least one projection optics of the one or more projection optics is physically coupled to the ring band to project the optical energy, as emitted, onto the surface to display information indicative of the one or more driving conditions.

8. The smart ring device of claim 6, wherein the optical source is disposed at least partially within the ring band, and at least one projection optics of the one or more projection optics is physically independent from the ring band and configured to project the optical energy, as emitted, from the optical source onto the surface to display information indicative of the one or more driving conditions.

9. The smart ring device of claim 1, wherein the projector module comprises a laser diode configured to emit optical energy, and wherein the projector module is configured to project the optical energy without utilizing projection optics to manipulate the optical energy emitted from the laser diode.

10. The smart ring device of claim 1, wherein the information indicative of the one or more driving conditions, as identified, includes one of a speed of a vehicle, an acceleration of the vehicle, a current weather condition, a sleepiness condition of the driver, a cognoscente condition of the driver, an operational status of the vehicle, an inebriation condition of the driver, or biometric information of the driver.

11. A method of displaying information indicative of driving conditions to a driver via a smart ring device comprising:
analyzing, by a processor disposed in a ring band of the smart ring device configured to be worn by the driver of a vehicle, data to identify one or more driving conditions;
receiving, via a user input unit comprising one or more optical sensors disposed at least partially within the ring band, a user input indicating a hand gesture, wherein the user input unit is communicatively coupled to the processor; and
causing information indicative of the identified one or more driving conditions to display based at least in part on the hand gesture via a projector module disposed at least partially within the ring band.

12. The method of claim 11, wherein the causing information indicative of the identified one or more driving conditions to display comprises causing scrolling the information indicative of the identified one or more driving conditions on a projection surface based on the user input.

13. The method of claim 12, wherein the causing information indicative of the identified one or more driving conditions to display further comprises:
causing the projector module to initiate scrolling, halt scrolling, increase a speed of scrolling, decrease a speed of scrolling, or rewind scrolling based on the user input.

14. The method of claim 11, wherein the user input is a second user input, wherein the user input unit is further configured to receive a first user input, wherein the processor is configured to verify a user based on the first user input.

15. The method of claim 11, wherein the user input further includes at least one of an orientation of the ring band, a hand movement, an input performed by a stylus, a captured image, an activation with a button, an activation of a switch, a gesture performed on a surface of a projection, or a virtual interaction with the projection.

16. The method of claim 11, wherein the projector module comprises:
an optical source configured to emit optical energy; and
one or more projection optics configured to project the optical energy, as emitted, from the optical source onto a surface to display the information indicative of the one or more driving conditions.

17. The method of claim 16, wherein the optical source is disposed such that the optical energy, as emitted, is emitted from an inner surface of the smart ring device, and at least one projection optics of the one or more projection optics is physically coupled to the smart ring device to project the optical energy, as emitted, onto the surface to display the information indicative of the one or more driving conditions.

18. The method of claim 16, wherein the optical source is disposed at least partially within the ring band, and at least one projection optics of the one or more projection optics is physically independent from the ring band and are configured to project the optical energy, as emitted, from the optical source onto the surface to display the information indicative of the one or more driving conditions.

19. The method of claim 11, wherein the projector module comprises a laser diode configured to emit optical energy.

20. The method of claim 11, wherein the information indicative of the identified one or more driving conditions includes at least one of a speed of the vehicle, an acceleration of the vehicle, a current weather condition, a sleepiness condition of the driver, a cognoscente condition of the driver, an operational status of the vehicle, an inebriation condition of the driver, or biometric information of the driver.

21. A smart ring device for displaying information indicative of driving conditions to a driver, the smart ring device comprising:
a means for receiving a user input indicating a hand gesture comprising one or more optical sensors disposed at least partially within a ring band;
a means for storing data thereon; and
a means, disposed in the ring band of the smart ring device configured to be worn by a driver of a vehicle, for performing operations comprising:
analyzing data to identify one or more driving conditions; and
causing information indicative of the identified one or more driving conditions to display based at least in part on the hand gesture via a projector module disposed at least partially within the ring band.

\* \* \* \* \*